United States Patent
Nelson et al.

(10) Patent No.: US 7,134,354 B2
(45) Date of Patent: Nov. 14, 2006

(54) DISPLAY FOR PROCESS TRANSMITTER

(75) Inventors: Scott D. Nelson, Plymouth, MN (US); John Brewer, Victoria, MN (US)

(73) Assignee: Rosemount Inc., Eden Prairie, MN (US)

(*) Notice: Subject to any disclaimer, the term of this patent is extended or adjusted under 35 U.S.C. 154(b) by 183 days.

(21) Appl. No.: 10/893,162

(22) Filed: Jul. 16, 2004

(65) Prior Publication Data
US 2005/0056106 A1 Mar. 17, 2005

Related U.S. Application Data

(63) Continuation-in-part of application No. 10/445,710, filed on May 27, 2003, now Pat. No. 6,898,980, which is a continuation-in-part of application No. 10/236,875, filed on Sep. 6, 2002, now abandoned, which is a continuation of application No. 10/125,286, filed on Apr. 18, 2002, now Pat. No. 6,568,279, which is a continuation of application No. 09/671,495, filed on Sep. 27, 2000, now Pat. No. 6,457,367.

(60) Provisional application No. 60/156,369, filed on Sep. 28, 1999.

(51) Int. Cl.
*G01D 7/00* (2006.01)

(52) U.S. Cl. ............... 73/866.3; 340/691.6; 340/815.4

(58) Field of Classification Search ............... 73/866.3, 73/866.1, 753, 756; 340/626, 691.6, 815.53, 340/815.4
See application file for complete search history.

(56) References Cited

U.S. PATENT DOCUMENTS

| | | | | |
|---|---|---|---|---|
| 524,752 | A * | 8/1894 | Bohm | 340/815.4 X |
| 1,171,715 | A * | 2/1916 | Griffith et al. | 340/815.53 X |
| 2,818,560 | A * | 12/1957 | Edrich | 340/815.4 |
| 3,698,122 | A | 10/1972 | Adams | 46/17 |
| 3,701,280 | A | 10/1972 | Stroman | |
| 3,968,694 | A | 7/1976 | Clark | |
| 4,094,083 | A | 6/1978 | Fund | 40/536 |
| 4,106,229 | A | 8/1978 | Schmid | 40/611 |
| 4,120,206 | A | 10/1978 | Rud, Jr. | 73/718 |
| 4,125,027 | A | 11/1978 | Clark | 73/724 |
| 4,184,153 | A * | 1/1980 | Glaubitz | 340/815.4 X |
| 4,238,825 | A | 12/1980 | Geery | |
| 4,250,490 | A | 2/1981 | Dahlke | 340/870.37 |
| 4,287,501 | A | 9/1981 | Tominaga et al. | 338/42 |
| 4,308,527 | A | 12/1981 | Morean et al. | 340/366 |
| 4,377,809 | A * | 3/1983 | Lawford | 340/623 |
| 4,414,634 | A | 11/1983 | Louis et al. | |
| 4,419,898 | A | 12/1983 | Zanker et al. | 73/861.02 |

(Continued)

FOREIGN PATENT DOCUMENTS

DE 37 41 648 A1 7/1988

(Continued)

OTHER PUBLICATIONS

Product Data Sheet No. 00813-0100-4378, "Model 751 Field Signal Indicator", by Rosemount Inc., Eden Prairie, Minnesota, (1997), month not given 8 pages.

(Continued)

*Primary Examiner*—Thomas P. Noland
(74) *Attorney, Agent, or Firm*—Westman, Champlin & Kelly, P.A.

(57) ABSTRACT

A transmitter for use in a process control system for monitoring an industrial process includes a housing having a top and a bottom and a height extending therebetween. A parallelogram display is mounted to the housing. Sides of the parallelogram display are arranged at angles relative to the height of the housing.

24 Claims, 3 Drawing Sheets

U.S. PATENT DOCUMENTS

| | | |
|---|---|---|
| 4,446,730 A | 5/1984 | Smith .......................... 73/301 |
| 4,455,875 A | 6/1984 | Guimard et al. .............. 73/708 |
| 4,485,673 A | 12/1984 | Stern |
| 4,528,855 A | 7/1985 | Singh .......................... 73/721 |
| 4,562,744 A | 1/1986 | Hall et al. ............... 73/861.02 |
| 4,598,381 A | 7/1986 | Cucci |
| 4,602,344 A | 7/1986 | Ferretti et al. |
| 4,617,607 A | 10/1986 | Park et al. .................. 361/283 |
| D287,827 S | 1/1987 | Broden ........................ D10/46 |
| 4,644,797 A | 2/1987 | Ichikawa et al. ............. 73/706 |
| 4,653,330 A | 3/1987 | Hedtke ........................ 73/756 |
| 4,677,841 A | 7/1987 | Kennedy |
| 4,745,810 A | 5/1988 | Pierce et al. .................. 73/706 |
| D296,995 S | 8/1988 | Lee ............................ D10/46 |
| D297,314 S | 8/1988 | Hedtke ........................ D10/46 |
| D297,315 S | 8/1988 | Pierce et al. ................. D10/85 |
| 4,783,659 A | 11/1988 | Frick ..................... 340/870.37 |
| 4,791,352 A | 12/1988 | Frick et al. ................... 324/60 |
| 4,798,089 A | 1/1989 | Frick et al. ................... 73/706 |
| 4,801,904 A | 1/1989 | Buckingham et al. ...... 340/114 |
| 4,809,550 A * | 3/1989 | Faulconer .............. 73/866.3 X |
| 4,818,994 A | 4/1989 | Orth et al. ............. 340/870.21 |
| 4,825,704 A | 5/1989 | Aoshima et al. ......... 73/861.42 |
| 4,833,922 A | 5/1989 | Frick et al. ................... 73/756 |
| 4,850,227 A | 7/1989 | Luettgen et al. .............. 73/708 |
| 4,866,989 A | 9/1989 | Lawless ....................... 73/756 |
| 4,881,412 A | 11/1989 | Northedge ............... 73/861.04 |
| 4,893,903 A | 1/1990 | Thaker et al. .............. 350/311 |
| 4,906,971 A * | 3/1990 | Schmid et al. ............. 340/462 |
| 4,926,572 A | 5/1990 | Holmes ........................ 40/448 |
| 4,930,353 A | 6/1990 | Kato et al. ................... 73/727 |
| 4,958,938 A | 9/1990 | Schwartz et al. ........... 374/208 |
| 4,970,898 A | 11/1990 | Walish et al. ................. 70/706 |
| 4,980,675 A | 12/1990 | Meisenheimer, Jr. ....... 340/626 |
| 5,000,047 A | 3/1991 | Kato et al. ................... 73/706 |
| D317,266 S | 6/1991 | Broden et al. ............... D10/46 |
| D317,269 S | 6/1991 | Selg ............................ D10/52 |
| D318,432 S | 7/1991 | Broden et al. ............... D10/46 |
| 5,028,746 A | 7/1991 | Petrich .................. 191/12.2 R |
| 5,035,140 A | 7/1991 | Daniels et al. |
| 5,046,616 A | 9/1991 | Makowski et al. ......... 206/467 |
| 5,051,937 A | 9/1991 | Kawate et al. |
| 5,058,437 A | 10/1991 | Chaumont et al. ....... 73/861.21 |
| 5,060,108 A | 10/1991 | Baker et al. ................. 361/283 |
| 5,070,732 A | 12/1991 | Duncan et al. ............... 73/431 |
| 5,083,091 A | 1/1992 | Frick et al. .................. 324/678 |
| 5,087,871 A | 2/1992 | Losel .......................... 323/299 |
| 5,094,109 A | 3/1992 | Dean et al. .................... 73/718 |
| 5,136,516 A | 8/1992 | Twombly ................. 364/426.05 |
| D329,619 S | 9/1992 | Cartwright ................... D10/52 |
| 5,142,914 A | 9/1992 | Kusakabe et al. ............. 73/723 |
| 5,157,972 A | 10/1992 | Broden et al. ................ 73/718 |
| 5,162,725 A | 11/1992 | Hodson et al. .............. 324/115 |
| 5,187,474 A | 2/1993 | Kielb et al. ............. 340/870.18 |
| 5,212,645 A | 5/1993 | Wildes et al. ............... 364/463 |
| 5,227,782 A | 7/1993 | Nelson .................. 340/870.11 |
| 5,236,202 A | 8/1993 | Krouth et al. ............... 277/164 |
| 5,245,333 A | 9/1993 | Anderson et al. ........ 340/870.3 |
| 5,248,167 A | 9/1993 | Petrich et al. ................ 285/23 |
| D342,456 S | 12/1993 | Miller et al. ................. D10/60 |
| 5,276,631 A | 1/1994 | Popovic et al. |
| 5,287,746 A | 2/1994 | Broden ........................ 73/706 |
| 5,353,200 A | 10/1994 | Bodin et al. ................. 361/816 |
| 5,369,386 A | 11/1994 | Alden et al. ................ 335/206 |
| 5,377,547 A | 1/1995 | Kusakabe et al. ............. 73/723 |
| 5,381,355 A | 1/1995 | Birangi et al. |
| D358,784 S | 5/1995 | Templin, Jr. et al. ........ D10/96 |
| 5,436,824 A | 7/1995 | Royner et al. ................. 363/89 |
| 5,448,180 A | 9/1995 | Kienzler et al. ............. 326/15 |
| 5,469,150 A | 11/1995 | Sitte ...................... 340/825.07 |
| 5,471,885 A | 12/1995 | Wagner ................. 73/862.041 |
| D366,000 S | 1/1996 | Karas et al. .................. D10/60 |
| D366,218 S | 1/1996 | Price et al. ................... D10/52 |
| 5,495,768 A | 3/1996 | Louwagie et al. ............ 73/706 |
| 5,498,079 A | 3/1996 | Price ........................... 374/208 |
| 5,502,659 A | 3/1996 | Braster et al. |
| 5,524,333 A | 6/1996 | Hogue et al. ................ 29/593 |
| 5,524,492 A | 6/1996 | Frick et al. ................... 73/706 |
| 5,546,804 A | 8/1996 | Johnson et al. .............. 73/431 |
| 5,600,782 A | 2/1997 | Thomson ............... 395/182.02 |
| 5,606,513 A | 2/1997 | Louwagie et al. .......... 364/510 |
| 5,650,936 A | 7/1997 | Loucks et al. |
| 5,656,782 A | 8/1997 | Powell, II et al. ............ 73/756 |
| 5,665,899 A | 9/1997 | Willcox ...................... 73/1.63 |
| 5,668,322 A | 9/1997 | Broden ........................ 73/756 |
| 5,669,713 A | 9/1997 | Schwartz et al. .............. 374/1 |
| 5,670,722 A | 9/1997 | Moser et al. ................. 73/756 |
| 5,677,476 A | 10/1997 | McCarthy et al. ......... 73/29.01 |
| 5,710,552 A | 1/1998 | McCoy et al. ......... 340/870.21 |
| 5,754,596 A | 5/1998 | Bischoff et al. ............. 375/295 |
| 5,764,928 A | 6/1998 | Lancott ...................... 395/285 |
| 5,819,455 A | 10/1998 | Tsuda ........................... 40/580 |
| 5,823,228 A | 10/1998 | Chou .......................... 137/597 |
| 5,870,695 A | 2/1999 | Brown et al. ................ 702/138 |
| 5,899,962 A | 5/1999 | Louwagie et al. ........... 702/138 |
| 5,920,016 A | 7/1999 | Broden ........................ 73/756 |
| 5,948,988 A | 9/1999 | Bodin .......................... 73/706 |
| 5,954,526 A | 9/1999 | Smith .......................... 439/136 |
| 5,955,684 A | 9/1999 | Gravel et al. .............. 73/866.5 |
| 5,973,942 A | 10/1999 | Nelson et al. ................. 363/21 |
| 5,983,727 A | 11/1999 | Wellman et al. .............. 73/724 |
| 5,988,203 A | 11/1999 | Hutton ........................ 137/597 |
| 6,002,996 A | 12/1999 | Burks et al. ................. 702/188 |
| 6,005,500 A | 12/1999 | Goboury et al. .............. 341/43 |
| 6,006,338 A | 12/1999 | Longsdorf et al. .......... 713/340 |
| 6,013,108 A | 1/2000 | Karolys et al. .............. 792/189 |
| 6,035,240 A | 3/2000 | Moorehead et al. ........... 700/2 |
| 6,038,927 A | 3/2000 | Karas .......................... 73/706 |
| 6,047,219 A | 4/2000 | Eidson ........................... 700/2 |
| 6,050,145 A | 4/2000 | Olson et al. .................. 73/706 |
| 6,058,441 A | 5/2000 | Shu ............................ 710/100 |
| 6,059,254 A | 5/2000 | Sundet et al. ............... 248/678 |
| 6,067,011 A | 5/2000 | Leslie ......................... 340/468 |
| 6,105,437 A | 8/2000 | Klug et al. ................... 73/756 |
| 6,111,888 A | 8/2000 | Green et al. ................ 370/461 |
| 6,115,831 A | 9/2000 | Hanf et al. .................... 714/43 |
| 6,123,585 A | 9/2000 | Hussong et al. ............. 439/652 |
| 6,131,467 A | 10/2000 | Miyano et al. ............... 73/756 |
| 6,140,952 A | 10/2000 | Gaboury ...................... 341/143 |
| 6,151,557 A | 11/2000 | Broden et al. ................ 702/47 |
| 6,175,770 B1 | 1/2001 | Bladow ......................... 700/2 |
| 6,177,877 B1 * | 1/2001 | Munyon ................... 340/815.4 |
| D439,177 S | 3/2001 | Fandrey et al. |
| D439,178 S | 3/2001 | Fandrey et al. |
| D439,179 S | 3/2001 | Fandrey et al. |
| D439,180 S | 3/2001 | Fandrey et al. |
| D439,181 S | 3/2001 | Fandrey et al. |
| 6,216,172 B1 | 4/2001 | Kolblin et al. .............. 709/253 |
| 6,219,876 B1 * | 4/2001 | Blum ............................ 15/215 |
| D441,672 S | 5/2001 | Fandrey et al. |
| 6,233,532 B1 | 5/2001 | Boudreau et al. ............. 702/89 |
| 6,267,010 B1 * | 7/2001 | Hatanaka et al. ............. 73/756 |
| 6,285,964 B1 | 9/2001 | Babel et al. ................. 702/121 |
| 6,295,875 B1 | 10/2001 | Frick et al. ................... 73/718 |
| 6,298,454 B1 | 10/2001 | Schleiss et al. ............... 714/37 |
| 6,311,568 B1 | 11/2001 | Kleven .................... 73/861.42 |
| 6,321,166 B1 | 11/2001 | Evans et al. .................. 702/50 |
| 6,415,188 B1 | 7/2002 | Fernandez et al. ............ 700/67 |
| 6,417,778 B1 * | 7/2002 | Blum et al. ................ 340/815.4 |
| 6,421,570 B1 | 7/2002 | McLaughlin et al. .......... 700/2 |
| 6,457,367 B1 | 10/2002 | Behm et al. .................. 73/753 |
| 6,460,094 B1 | 10/2002 | Hanson et al. ................. 710/8 |
| 6,484,107 B1 | 11/2002 | Roper et al. .................. 702/50 |
| 6,487,912 B1 | 12/2002 | Behm et al. .................. 73/753 |

| | | | |
|---|---|---|---|
| 6,504,489 B1 | 1/2003 | Westfield et al. | 340/870.3 |
| 6,510,740 B1 | 1/2003 | Behm et al. | 73/708 |
| 6,511,337 B1 | 1/2003 | Fandrey et al. | 739/320 |
| 6,516,672 B1 | 2/2003 | Wang | 73/718 |
| D471,829 S | 3/2003 | Dennis et al. | D10/85 |
| D472,831 S | 4/2003 | Dennis et al. | D10/85 |
| 6,546,805 B1 | 4/2003 | Fandrey et al. | 73/753 |
| 6,568,279 B1 | 5/2003 | Behm et al. | 73/756 |
| 6,571,132 B1 | 5/2003 | Davis et al. | 700/2 |
| 6,593,857 B1 | 7/2003 | Roper et al. | 340/870 |
| 6,609,427 B1 | 8/2003 | Westfield et al. | 73/753 |
| 6,662,662 B1 | 12/2003 | Nord et al. | 73/715 |
| 6,701,274 B1 | 3/2004 | Eryurek et al. | 702/140 |
| 6,765,968 B1 | 7/2004 | Nelson et al. | 375/253 |
| 6,898,980 B1 | 5/2005 | Behm et al. | 73/756 |
| 2002/0108448 A1* | 8/2002 | Behm et al. | 73/753 |
| 2004/0217877 A1* | 11/2004 | Kokonaski et al. | 340/815.4 |
| 2005/0056106 A1 | 3/2005 | Nelson | 73/866.3 |

FOREIGN PATENT DOCUMENTS

| | | | | |
|---|---|---|---|---|
| DE | 4020318 A1 * | 1/1991 | | 73/866.3 |
| DE | G 91 09 176.4 | 10/1991 | | |
| DE | 197 45 244 A1 | 4/1998 | | |
| DE | 299 03 260 U1 | 5/2000 | | |
| EP | 0 063 685 A1 | 11/1982 | | |
| EP | 0 167 941 A2 | 1/1986 | | |
| EP | 0 214 801 A1 | 3/1987 | | |
| EP | 0 223 300 A2 | 5/1987 | | |
| EP | 0 268 742 A1 | 6/1988 | | |
| EP | 0 639 039 A1 | 2/1995 | | |
| EP | 0 903 651 A1 | 3/1999 | | |
| GB | 2190944 A * | 12/1987 | | 340/815.53 |
| JP | 54143248 A * | 11/1979 | | 340/815.4 |
| JP | 63124916 A * | 5/1988 | | 73/866.1 |
| JP | 401313038 | 12/1989 | | |
| JP | 06133850 A * | 5/1994 | | 340/815.4 |
| JP | 08292438 A * | 11/1996 | | |
| JP | 10009938 A * | 1/1998 | | |
| JP | 2000121470 | 10/1998 | | |
| WO | WO 88/01417 | 2/1988 | | |
| WO | WO 89/02578 | 3/1989 | | |
| WO | WO 89/04089 | 5/1989 | | |
| WO | WO 90/15975 | 12/1990 | | |
| WO | WO 91/18266 | 11/1991 | | |
| WO | WO 96/34264 | 10/1996 | | |
| WO | WO 98/48489 | 10/1998 | | |
| WO | WO 00/23776 | 4/2000 | | |

OTHER PUBLICATIONS

Product Data Sheet No. 00813-0100-4731, "APEX™ Radar Gauge", by Rosemount Inc., Eden Prairie, Minnesota, (1998), month not given 8 pages.

Product Data Sheet No. 00813-0100-4640, "Model 3201 Hydrostatic Interface Unit", from the Rosemount Comprehensive Product Catalog, published 1998, by Rosemount Inc., Eden Prairie, Minnesota.

Product Data Sheet No. 00813-0100-4003, "Model 8800A", by Rosemount Inc., Eden Prairie, Minnesota, (1998), month not given 17 pages.

Product Data Sheet No. 00813-0100-4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota, 2 pages month not given.

"Rosemount Model 8732C Magnetic Flowmeter Transmitter", by Rosemount Inc., Eden Prairie, Minnesota, (1998), month not given 4 pages.

Product Data Sheet No. 00813-0100-4263, "Model 444 Alphaline® Temperature Transmitters", by Rosemount Inc., Eden Prairie, Minnesota, (1997), month not given 12 pages.

Product Data Sheet No. 00813-0100-4769, "Model 3244MV Multivariable Temperature Transmitter with FOUNDATION™ Fieldbus", by Rosemount Inc., Eden Prairie, Minnesota, (1998), month not given 16 pages.

Product Data Sheet No. 00813-0100-4724, "Models 3144 and 3244MV Smart Temperature Transmitters", by Rosemount Inc., Eden Prairie, Minnesota, (1998), month not given 12 pages.

Product Data Sheet No. 00813-0100-4738, "Model 3095FB Multivariable™ Transmitter with Modbus™ Protocol", by Rosemount Inc., Eden Prairie, Minnesota, (1996, 1997), month not given 14 pages.

Product Data Sheet No. 00813-0100-4001, "Model 3051 Digital Pressure Transmitter for Pressure, Flow, and Level Measurement", by Rosemount Inc., Eden Prairie, Minnesota, (1998), month not given 13 pages.

Product Data Sheet No. 00813-0100-4698, "Model 2090F Sanitary Pressure Transmitter", by Rosemount Inc., Eden Prairie, Minnesota, (1998), Nov., 8 pages.

Product Data Sheet No. 00813-0100-4690, "Model 2088 Economical Smart Pressure Transmitter", by Rosemount Inc., Eden Prairie, Minnesota, (1998), month not given 11 pages.

Product Data Sheet No. 00813-0100-4592, "Model 2024 Differential Pressure Transmitter", by Rosemount Inc., Eden Prairie, Minnesota, (1987-1995), month not given 8 pages.

Product Data Sheet No. 00813-0100-4360, "Model 1151 Alphaline® Pressure Transmitters", by Rosemount Inc., Eden Prairie, Minnesota, (1998), month not given 28 pages.

Product Data Sheet No. 00813-0100-4458,"Model 1135F Pressure-to-Current Converter", by Rosemount Inc., Eden Prairie, Minnesota, (1983, 1986, 1994), month not given 3 pages.

"Single Chip Senses Pressure and Temperature," *Machine Design*, 64 (1992) May 21, No. 10, 1 page.

Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.

Technical Information Bulletin, "Liquid Level Transmitter Model DB40RL Sanitary Sensor *deltapoint*," Endress + Hauser, Greenwood, Indiana, Sep. 1992, pp. 1-8.

"The Digitisation of Field Instruments" W. Van Der Bijl, *Journal A*, vol. 32, No. 3, 1991, pp. 62-65, month not given.

Specification Summary, "*TELETRANS*™ 3508-30A Smart Differential Pressure Transmitter," (undated) Bristol Babcock, Inc., Watertown, CT, 06795, by Dec. 1994, 10 pages.

Specification Summary, "*TELETRANS*™ 3508-10A Smart Pressure Transmitter," (undated) Bristol Babcock, Inc., Watertown, CT, 06795, 10 pages, by Dec. 2004.

Specification Summary, "AccuRate Advanced Gas Flow Computer, Model GFC 3308," (undated) Bristol Babcock, Inc., Watertown, CT, 06795, 12 pages, by Dec. 2004.

Product Data Sheet PDS 4640, "Model 3201 Hydrostatic Interface Unit," Mar. 1992, Rosemount Inc., Eden Prairie, MN 55344, pp. 1-7.

Product Data Sheet PDS 4638, "Model 3001CL Flush-Mount Hydrostatic Pressure Transmitter," Jul. 1992, Rosemount Inc., Eden Prairie, MN 55344, pp. 1-7.

"Flow Measurement," *Handbook of Fluid Dynamics*, V. Streeter, Editor-in-chief, published by McGraw-Hill Book Company, Inc. 1961, pp. 14-4 to 14-15, month not given.

"Precise Computerized In-Line Compressible Flow Metering," *Flow—Its Measurement and Control in Science and Industry*, vol. 1, Part 2, Edited by R. Wendt, Jr., Published by American Institute of Physics et al, (undated) pp. 539-540, by Dec. 2004.

"A Systems Approach," Dr. C. Ikoku, *Natural Gas Engineering*, PennWell Books, (undated) pp. 256-257, by Dec. 2004.

"Methods for Volume Measurement Using Tank-Gauging Devices Can Be Error Prone," F. Berto, *The Advantages of Hydrostatic Tank Gauging Systems*, undated reprint from *Oil & Gas Journal*, 9 pages by Dec. 2004.

"Hydrostatic Tank Gauging—Technology Whose Time Has Come," J. Berto, *Rosemount Measurement Division Product Feature*, undated reprint from *INTECH*, by Dec. 2004, 3 pages.

"Pressure Sensors Gauge Tank Level and Fluid Density," *Rosemount Measurement Division Product Feature*, undated reprint from *Prepared Foods* (Copyrighted 1991 by Gorman Publishing Company), 3 pages month not given.

"Low Cost Electronic Flow Measurement System," *Tech Profile*, May 1993, Gas Research Institute, Chicago, IL, 2 pages.

"Development of an Integrated EFM Device for Orifice Meter Custody Transfer Applications," S.D. Nierble et al., *American Gas Association Distribution/Transmission Conference &Exhibit*, May 19, 1993, 6 pages.

Advertisement, AccuRate Model 3308 Integral Smart DP/P/T Transmitter, (undated) Bristol Babcock, Inc., Watertown, CT 06795, p. 63 by Dec. 2004.

Advertisement, Model 3508 DP Transmitter, *Control Engineering*, Dec. 1992, Bristol Babcock, Inc., Watertown, CT 06795, p. 93.

"Smart Transmitters Tear Up The Market," C. Polsonetti, *INTECH*, Jul. 1993, pp. 42-45.

"MicroLAN Design Guide", Dallas Semiconductor, Tech Brief No. 1, (undated), by Dec. 2004 3 pages.

"Bosch CAN Specification Version 2.0", by Robert Bosch GmbH, pp. 1-68 including pp. -1- and -2-, (Sep. 1991).

Product Data Sheet No. 00813-0100-4001, "Digital Pressure Transmitter for Pressure, Flow, and Level Measurement", by Rosemount Inc., (1998), month not given 40 pages.

"Claudius Ptolemy (100?-170? AD)", *M&C News*, 7 pages, (Apr. 1994).

American National Standard , "Hydraulic Fluid Power-Solenoid Piloted Industrial Valves-Interface Dimensions fo Electrical Connectors", National Fluid Power Association, In., 10 pages, (Aug. 1981).

2 pages downloaded from http://www.interlinkbt.com/PRODUCT/IBT_PROD/DN/CN-DM_PN/EURO-DP.HTM dated Sep. 15, 2000.

4 pages downloaded from http://www.interlinkbt.com/PRODUCT/IBT_PROD/dn/EUR-CON/euro-fwc.htm dated Sep. 15, 2000.

3 pages from TURCK Cable Standards, by TURCK, Inc., Minneapolis, Minnesota, pages 2-4 of 15 Aug. 2000.

"Notification of Transmittal of the International Search Report or Declaration" for International application Serial No. PCT/US00/26561.

"Notification of Transmittal of the International Search Report or Declaration" for International application Serial No. PCT/US00/26488.

"Notification of Transmittal of the International Search Report or Declaration" for International application Serial No. PCT/US00/26563.

"Notification of Transmittal of the International Search Report or Declaration" for International application Serial No. PCT/US01/13993.

"Notification of Transmittal of the International Search Report or Declaration" for International application Serial No. PCT/US01/14521.

* cited by examiner

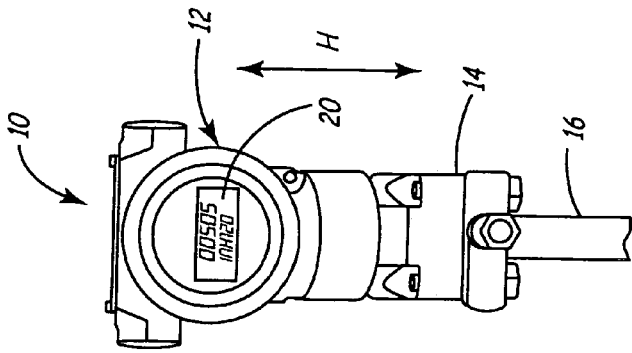
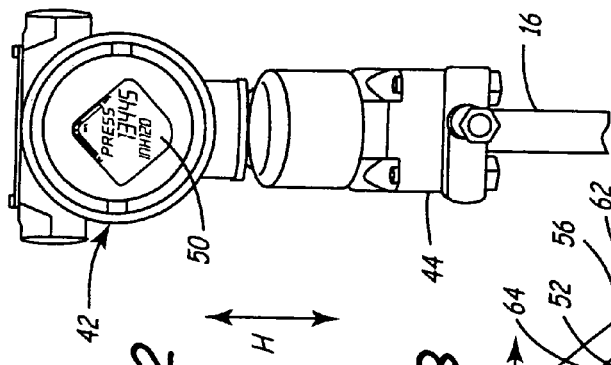
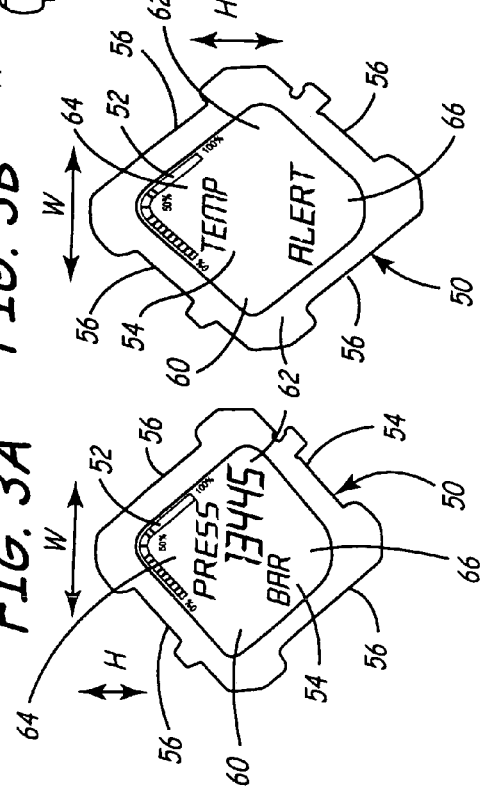

DISPLAY FOR PROCESS TRANSMITTER

The present application is a Continuation-In-part of and claims priority of U.S. patent application Ser. No. 10/236,875, filed Sep. 6, 2002, now abandoned the present application is a also a Continuation-In-Part of and claims priority of U.S. patent application Ser. No. 10/445,710, filed May 27, 2003, now U.S. Pat. No. 6,898,980 which is a Continuation of Ser. No. 10/125,286, filed on Apr. 18, 2002 now U.S. Pat. No. 6,568,279, which is a Continuation of Ser. No. 09/671,495, filed Sep. 27, 2000, now U.S. Pat. No. 6,457,367, which claims the benefit of 60/156,369, filed Sep. 28, 1999, the contents of which are hereby incorporated by reference in their entirety.

BACKGROUND OF THE INVENTION

The present invention relates to equipment used to monitor and control industrial processes. More specifically, the present invention relates to displays for transmitters which are used to measure process variables of an industrial process.

Industrial processes are used to monitor and control process fluids such as for manufacturing or refining. Example industrial processes include oil refineries, food manufacturing plants, paper pulp preparation facilities, and many others.

In industrial processes, it is often necessary for an operator to obtain information regarding the operation of the process. Remote units, known as "transmitters," are coupled to the process and transmit information related to process variables (pressure, temperature, flow rate, etc.) to a control room. The process variables can be viewed or operated upon with equipment in the control room.

In some instances, it is desirable for an operator to view information from a process transmitter directly. Therefore, some process transmitters include displays which are used to directly display the measured process variable or other information related to the transmitter on a face of the transmitter. For example, an operator can use the display to calibrate or configure the process transmitter.

Although process transmitters have many physical configurations, a common design includes a housing having a process coupling side or a process couple face and a cylindrical cavity which houses various transmitter circuitry. The cylindrical housing arranged perpendicular to the process coupling face and is sealed with end caps which screw into each end of the cylinder. When a display is added to such a transmitter, it is typically located near one of the end caps. The end cap can have a clear window such that the display can be viewed externally. The display itself is typically rectangular and is placed squarely on the transmitter housing, i.e., it is oriented such that the long sides of the rectangular display are parallel to a width of the transmitter and the short sides are parallel to a height. Information is then displayed in a standard fashion across the width of the rectangular display, with the displayed characters and symbols aligned with the sides of the display.

SUMMARY OF THE INVENTION

A transmitter for use in a process control system for monitoring an industrial process includes a housing having a top and a bottom and a height extending therebetween. A process variable sensor is configured to sense a process variable of the process and provide a process variable output to transmitter circuitry which provides a display output. A parallelogram display is mounted to the housing with sides of the parallelogram display at angles relative to the height of the housing. In another aspect, characters are aligned at an angle with a parallelogram display.

BRIEF DESCRIPTION OF THE DRAWINGS

FIG. 1 is a side plan view of a transmitter including a prior art display.

FIG. 2 is a side plan view of a transmitter including a display in accordance with an example embodiment of the present invention.

FIGS. 3A and 3B are side plan views of the display of the display of FIG. 2 and illustrates the display of different types of information.

DETAILED DESCRIPTION OF THE PREFERRED EMBODIMENTS

Figure 3C:
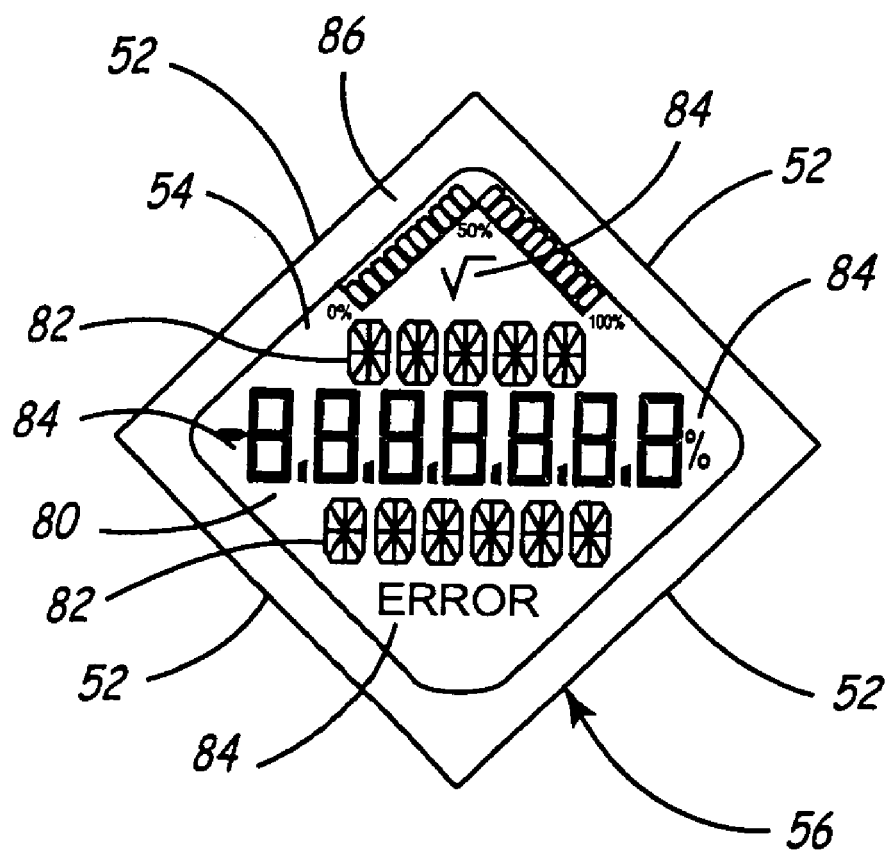
FIG. 3C is a front plan view of the display showing segments of the display.

The present invention includes a process control transmitter having a display which is angled relative to a height and a width of a transmitter. This configuration allows additional information to be shown across the display. In one aspect, an angled parallelogram display is configured to display characters or data in a horizontal and/or vertical direction. As the display is angled relative to the transmitter height and width, the horizontal and vertical directions form an angle with sides of the display which is between 0 and 90°. In one specific embodiment, the angle is about 45°. In one aspect, a parallelogram display is provided in which characters on the display are angled relative to sides of the display.

FIG. 1 is a side plan view of a prior art transmitter 10 for use in a process control system for monitoring an industrial process. Transmitter 10 includes a housing 12 which couples to process piping 16 to a process coupling 14. Housing 12 extends in a height direction H which is a direction away from the process coupling 14. A width direction is perpendicular to the height direction.

As illustrated in FIG. 1, transmitter 10 includes a display 20. Display 20 is a rectangular display which is arranged squarely with the height and width directions i.e., the short sides of the rectangle of the display are oriented parallel with the height direction and the long sides of the rectangle are oriented perpendicular to the height direction. Further, the characters on display 20 are also aligned with the sides of the rectangle. Frequently, LCDs (liquid crystal display) are used in which information is conveyed by activating elongate liquid crystal segments. Although displays which use segments are limited in the types of graphics and characters which can be displayed, a display with seven segments can be arranged such that all numbers can be illustrated. Further, a display with fourteen segments can be used to display alphabetical characters in addition to numeral characters. More complex graphics can be displayed using a matrix of dots.

FIG. 2 is a side plan view of a transmitter 40 in accordance with one embodiment of the present invention. Transmitter 40 includes housing 42 and process coupling 44 which couples to process piping 16. In the arrangement shown in FIG. 2, a parallelogram display, specifically a display 50 is oriented such that sides of the square or rectangular display are at an angle to the height direction of the transmitter. In one embodiment, the rectangle comprises a square and the sides are all at a 45° angle to the height and width directions of transmitter 40. Further, characters on the display 50 may be arranged at an angle relative to the sides of the display. In this embodiment, the angle of some of the characters relative to the sides of the display 50 are the same as the angle of the sides of the display 50 relative to the height and width directions of the transmitter 40 such that the characters aligned in a direction perpendicular to the height direction. When using a segmented display, many of the segments which are used to form numbers are oriented perpendicular to and parallel with the height direction.

Although the present invention includes a display which is a parallelogram, in one preferred embodiment, both sides of the parallelogram are parallel to thereby form either a rectangle or a square. Although a rectangular (specifically a square) display is shown, in one aspect parallelogram displays can be used.

FIGS. 3A and 3B are front plan views of display 50 showing different types of display information. Display 50 is shown with a graphical display 52 which comprises a bar graph oriented around a top corner 64 of the parallelogram. It is appreciated that by following the angles of the parallelogram, efficient use is made of the display area. Alphanumeric information 54 is also shown on the display 50. The alphanumeric information 54 is arranged at an angle relative to sides 56 of the display. In this embodiment, the alphanumeric information is at an angle of 45° to each of the four sides 56 of display 50. The display 50 has a height H and a width W and the alphanumeric information is aligned parallel with the width W and perpendicular to the height H. The alphanumeric information is formed using elongate display segments, for example, liquid crystal segments. For those liquid crystal segments used to display numerical information, the segments are aligned parallel to either the width or the height of the display 50. As used herein, a "character axis" is the axis along which characters are aligned, such as parallel to the width or height directions. This configuration allows information to be displayed between two opposed corners 60 and 68 of the parallelogram display. With such a configuration, relatively large alphanumerics or other information can be displayed between the two opposed side corners 60 and 62. Information can further be shown in a smaller form in a top corner 64 and a bottom corner 66 of the display 50. It is appreciated that some characters may be parallel to the width of the display while other characters may follow the sides and/or angles of the display (i.e., the bar graph shown in the top corner) or otherwise be arranged at any desired angle to better utilize the display area.

FIG. 3C is a front plan view of display 50 showing various characters and display segments. Display 50 includes a numeric display portion 80 which consists of seven separate seven segment display elements and adjacent periods arranged across opposed corners of display 50. Also illustrated in FIG. 3C are alphanumeric portions 82 which comprise a row of five and a row of six separate fourteen segment display elements arranged across the width of display 50. Fixed display elements 84 are also shown in FIG. 3C. In this example, they include the square root sign, a minus sign, the percent sign, and the word "ERROR." The present invention can include other display configurations and formats. In one embodiment, the present invention is implemented using liquid crystal or light emitting diode elements. However, any display technology can be used. Although display 50 is shown including segments and fixed display elements, the display of the present invention can also comprise individual dots to form a dot matrix or other display techniques. A dot matrix display provides more flexibility in that the dots can be arranged to display any desired character.

Figure 4:
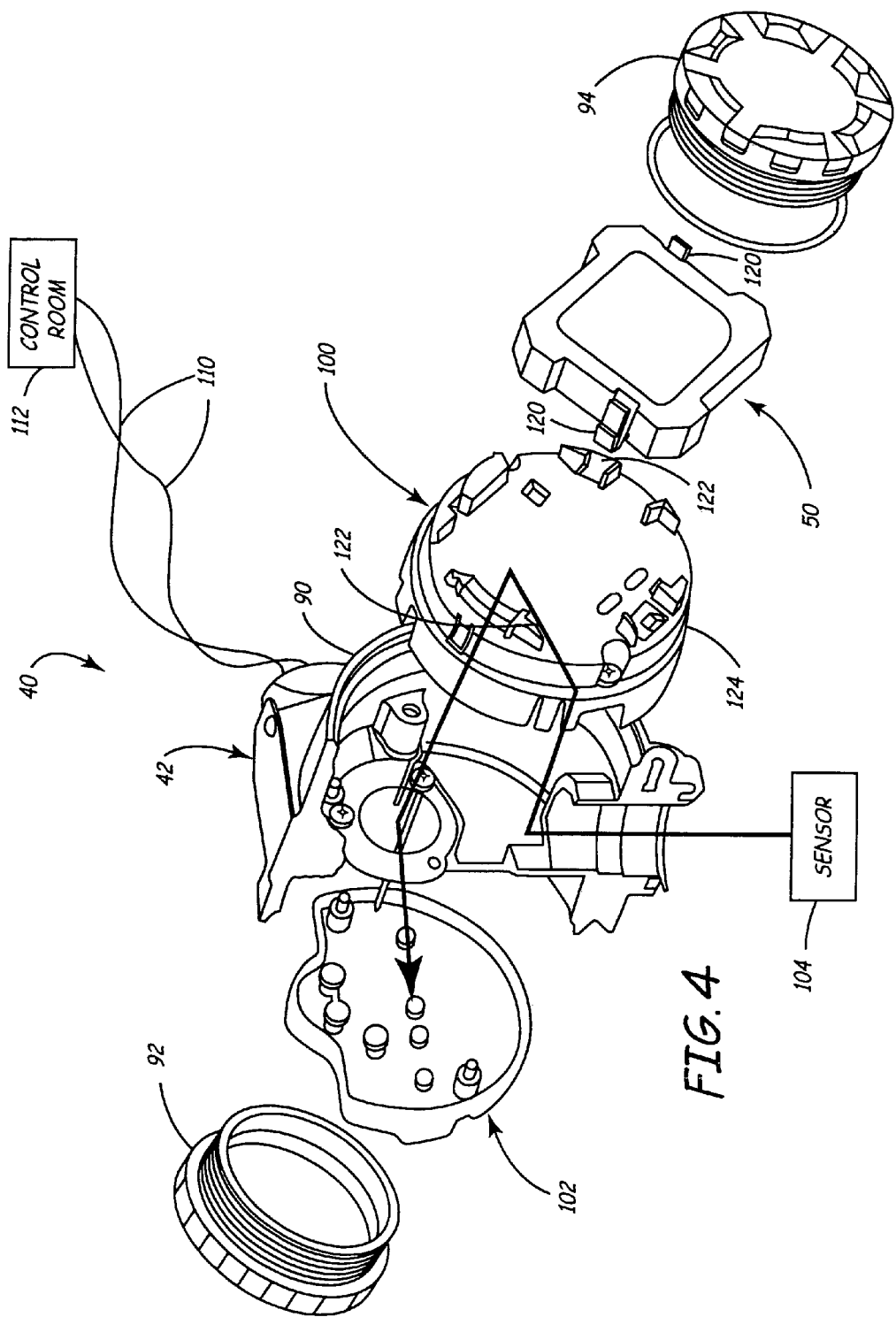
FIG. 4 is an exploded perspective view of a transmitter including the display of FIGS. 3A through 4.

FIG. 4 is an exploded view of transmitter 40 showing the various components which are carried inside housing 42. Housing 42 includes a cylindrical section 90 which is sealed by end cap 92 and 94. Within cylindrical section 90 is transmitter circuitry 100 and terminal block 102. Transmitter circuitry 100 is configured to couple to a process variable sensor 104. Sensor 104 can be located internal to housing 42 or externally. Process variable data from sensor 104 is received by transmitter circuitry 100 and coupled to a two-wire process control loop 110 through a terminal block 102. Process control loop 110 couples to a control room 112. Process control loop 110 can be in accordance with any appropriate technique or standard. For example, in one preferred embodiment loop 112 comprises a two wire process control loop which carries a current level of the between 4 milliamps and 20 milliamps. In some embodiments transmitter circuitry 100 including display 50 is completely powered with power received over loop 110.

Display 50 can be configured to snap into circuitry 100 using tabs 120 which mate with receptacle tabs 122. An electrical plug on display 50 plugs is received by circuit plug 124.

The angle design of the display of the present invention allows for increased usability of the glass area of a display, especially the center set of characters which extend across the width of the display. Other techniques can also be used to increase the display area such as using a round display. However, these are more difficult to obtain or fabricate and therefore more expensive. Electrical contacts for coupling to such displays can also be problematic. In the specific embodiment set forth herein, there are about 240 segments to the display which require 42 electrical contacts which are spaced along two sides of the glass used for the display. The use of the rotated display is relatively inexpensive and provides a sufficient number of contacts along the edges for display of the desired information.

Although the display of the present invention is shown with a particular transmitter configuration, the display can be used with other process control instrumentation (including any process device which is located in the field such as control elements) in which it is desirable to display information. The invention efficiently utilizes the space available on the face of the instrumentation. External space for displaying information on a process device is limited. The invention allows additional data to be displayed, or to be displayed in a more readable format, then in typical prior art designs. Although a parallelogram and specifically a square configuration are illustrated, the present invention can be used with other configurations including rectangles. It is further appreciated that the parallelogram display does not require rounded or curved corners (such as in circular displays). Such rounded or curved corners are difficult to manufacture and increase manufacturing costs.

Although the present invention has been described with reference to preferred embodiments, workers skilled in the art will recognize that changes may be made in form and detail without departing from the spirit and scope of the invention. The sensor and/or display can be located remotely to the transmitter or transmitter circuitry.

What is claimed is:

1. A transmitter for use in a process control system for monitoring an industrial process, comprising:

a housing having a top and a bottom and a height extending therebetween, the housing including a cylindrical portion sealed with round end cap containing a window;

a process variable sensor configured to sense a process variable of the process and responsively provide a process variable output;

transmitter circuitry in the housing configured to provide a display output;

a parallelogram display mounted to the housing in the cylindrical portion with sides of the parallelogram display at an angle relative to the height of more than zero degrees and less than ninety degrees, the display visible through the window of the end cap; and the display configured to display information in response to the display output.

2. The apparatus of claim 1 wherein the parallelogram comprises a rectangle.

3. The apparatus of claim 1 wherein the parallelogram display comprises a square.

4. The apparatus of claim 1 wherein an angle between a side of the parallelogram display and the height is forty five degrees.

5. The apparatus of claim 1 wherein the parallelogram display includes at least one display segment having a length and display segment length is generally parallel with the height.

6. The apparatus of claim 5 including a second display segment arranged at an angle to the height.

7. The apparatus of claim 1 wherein the parallelogram display includes at least one display segment having a length and the display segment length is generally perpendicular to the height.

8. The apparatus of claim 7 including a second display segment arranged at an angle to the height.

9. The apparatus of claim 1 including a mount configured to couple to the process and the height is in a direction away from the mount.

10. The apparatus of claim 1 wherein the sensor is located remotely from the transmitter housing and coupled to the transmitter circuitry through an electrical connection.

11. The apparatus of claim 1 wherein the sensor is contained in the transmitter housing.

12. The apparatus of claim 1 wherein the display is positioned remotely from the transmitter circuitry.

13. A transmitter for use in a process control system used to monitor an industrial process, comprising:

a housing, the housing including a cylindrical portion sealed with a round end cap containing a window;

a process variable sensor configured to sense a process variable of the process and provide a process variable output responsively;

transmitter circuitry coexisting in the housing configured to provide a display output; and a parallelogram display in the cylindrical portion configured to display information related to the display output and having four sides and mounted to the housing configured to display a plurality of characters aligned with a character axis, the character axis arranged at an angle of more than zero degrees and less than ninety degrees to the sides of the parallelogram display, the display visible through the window of the end cap.

14. The apparatus of claim 13 wherein at least a portion of the characters are aligned with the sides of the display.

15. The apparatus of claim 14 wherein an angle between the character axis and a side of the parallelogram display is about 45°.

16. The apparatus of claim 14 wherein the parallelogram comprises a rectangle.

17. The apparatus of claim 14 wherein the parallelogram display comprises a square.

18. The apparatus of claim 13 wherein the housing has a top and a bottom and a height extending therebetween and sides of the parallelogram are at an angle relative to the height of more than zero degrees and less than ninety degrees.

19. The apparatus of claim 18 wherein an angle between a side of the parallelogram display and the height is forty five degrees.

20. The apparatus of claim 18 wherein the parallelogram display includes at least one display segment having a length which is generally parallel with the height.

21. The apparatus of claim 18 wherein the parallelogram display includes at least one display segment having a length which is generally perpendicular to the height.

22. The apparatus of claim 18 including a mount configured to couple to the process and the height is in a direction away from the mount.

23. The apparatus of claim 13 wherein the sensor is located remotely from the transmitter housing and coupled to the transmitter circuitry through an electrical connection.

24. The apparatus of claim 13 wherein the sensor is contained in the transmitter housing.

* * * * *